United States Patent [19]
Iuchi et al.

[11] Patent Number: 5,287,957
[45] Date of Patent: Feb. 22, 1994

[54] CONVEYOR FOR TRANSPORTING CONTAINERS

[75] Inventors: Tetsuya Iuchi; Takao Miki; Hisanori Hamada, all of Tokushima, Japan

[73] Assignee: Shikoku Kakoki Co, Ltd., Itano, Japan

[21] Appl. No.: 51,813

[22] Filed: Apr. 26, 1993

Related U.S. Application Data

[63] Continuation of Ser. No. 875,942, Apr. 30, 1992, abandoned.

[30] Foreign Application Priority Data

May 8, 1991 [JP] Japan .................................. 3-102811

[51] Int. Cl.[5] ............................................ B65G 17/12
[52] U.S. Cl. ........................... 198/803.14; 198/803.15; 198/832.1
[58] Field of Search ................... 198/418, 418.1, 418.2, 198/803.2, 803.14, 803.15, 832.1

[56] References Cited

U.S. PATENT DOCUMENTS

| 2,103,681 | 12/1937 | Klaucke | 198/803.15 |
| 2,105,795 | 1/1938 | Risser | 198/803.15 |
| 3,538,997 | 11/1970 | Christine et al. | 198/803.15 |

FOREIGN PATENT DOCUMENTS

| 0286514 | 10/1988 | European Pat. Off. | |
| 2610904 | 9/1977 | Fed. Rep. of Germany | |
| 521115 | 5/1940 | United Kingdom | 198/803.15 |

*Primary Examiner*—Joseph E. Valenza
*Attorney, Agent, or Firm*—Armstrong, Westerman, Hattori, McLeland & Naughton

[57] ABSTRACT

A container transport conveyor comprising different kinds of container holders for different kinds of containers, and means for moving the holders along a predetermined path intermittently by a specified pitch at a time. The holders are divided into groups each comprising the combination of the different kinds of holders each one in number. The groups are arranged in succession along the path and identical in the order of the kinds of holders in the group. The spacing between the holders of the same kind in the groups adjacent to each other is equal to the pitch the holders are moved at a time.

7 Claims, 2 Drawing Sheets

CONVEYOR FOR TRANSPORTING CONTAINERS

This application is a continuation of application Ser. No. 07/875,942 filed Apr. 30, 1992, now abandoned.

BACKGROUND OF THE INVENTION

1. Field of the Invention

The present invention relates to container transport conveyors for use in packaging machines for filling cup-shaped containers with dessert foods such as custard puddings, jellys, yogurts or ice creams.

2. Description of the Related Art

Such conveyors heretofore known comprise a plurality of holder plates connected between a pair of endless belts and formed with container holding apertures.

The container holding apertures are formed in the holder plates in conformity with the size and shape of the containers to be transported by the conveyor. Accordingly, when containers which are different in size or shape from those previously handled are to be transported by the conveyor, the holder plates need to be replaced by those formed with holding apertures in conformity with the containers to be transported, heretofore a cumbersome procedure.

SUMMARY OF THE INVENTION

The main object of the present invention is to provide a container transport conveyor which is adapted to transport different kinds of containers having varying sizes or shapes without the necessity of changing the holder plates.

The present invention provides a conveyor for transporting different kinds of containers varying, for example, in size, the conveyor comprising different kinds of container holders corresponding to the different kinds of containers, and means for moving the holders along a predetermined path intermittently by a specified pitch at a time, all the holders being divided into groups each comprising the combination of the different kinds of holders each one in number, the groups being arranged in succession along the path and being identical in the order of the kinds of holders in the group, the spacing between the holders of the same kind in the groups adjacent to each other being equal to the pitch the holders are moved at a time.

According to the present invention, the holders for the containers to be transported are selected from among the different kinds of holders for the selected holders to transport the desired containers, so that different kinds of containers, varying in size or shape, can be transported without changing the holder plates.

DESCRIPTION OF THE PREFERRED EMBODIMENTS

Embodiments of the invention will be described below with reference to the drawings.

Figure 1:
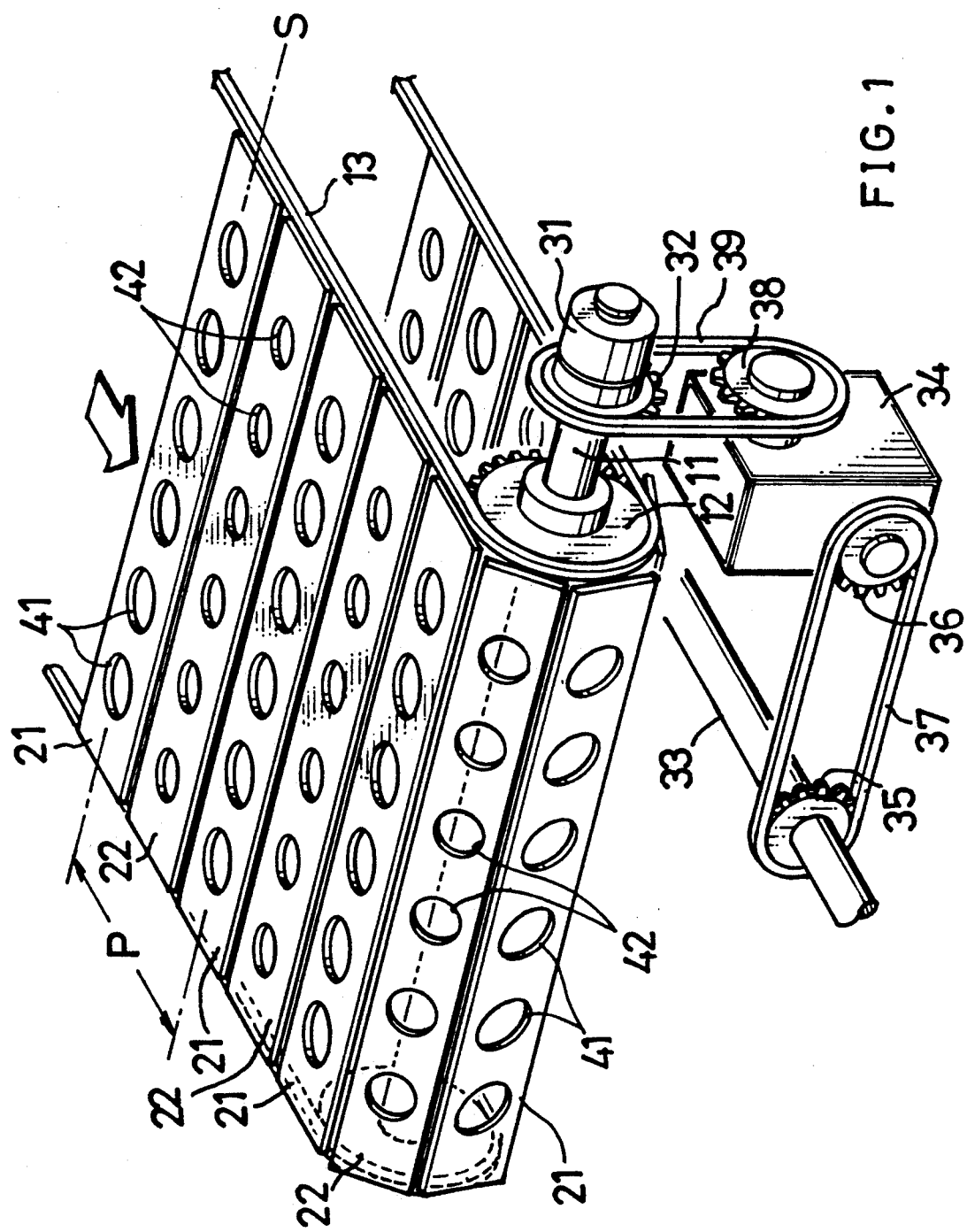
FIG. 1 is a fragmentary perspective view of a container transport conveyor embodying the invention.
Figure 2A:
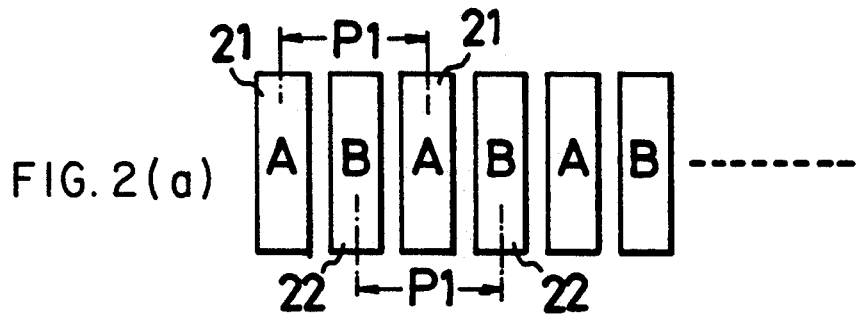
FIG. 2(a)–(e) includes diagrams illustrating examples of different combinations of holder slats.
Figure 2B:
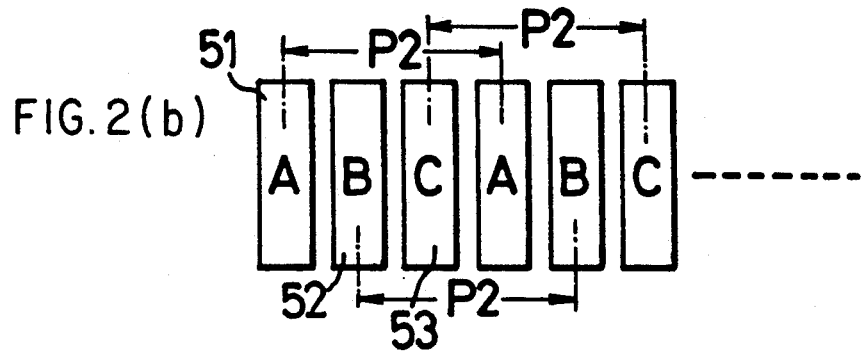
Figure 2C:
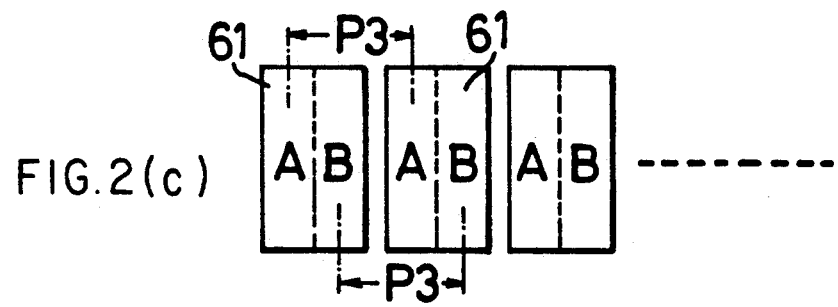
Figure 2D:
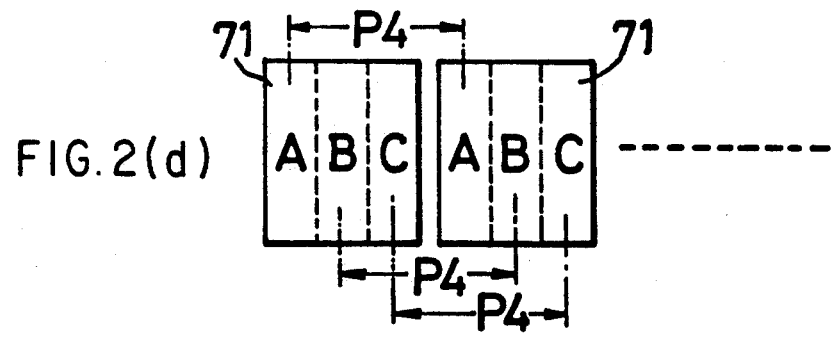
Figure 2E:
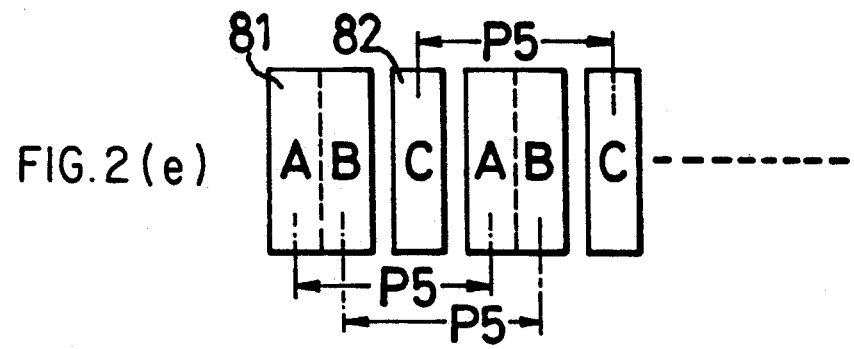

In the following description, the terms "front" and "rear" are used with respect to the direction of travel of the slats of the conveyor described; the direction in which the slats advance (as indicated by an arrow in FIG. 1) is referred to as "front," and the opposite direction as "rear." The terms "right" and "left" are used for the conveyor as it is seen from the front rearward.

The illustrated container transport conveyor comprises a pair of right and left drive sprockets 12 spaced apart by a predetermined distance and fixed to a drive shaft 11, a pair of right and left endless chains 13 reeved around the respective sprockets, and two kinds of slats, i.e., first and second slats 2, 22, connected between the chains and arranged alternately in succession.

A power transmission sprocket 32 is coupled to the right end of the drive shaft 11 via a clutch 31. A horizontal main shaft 33 extends below the lower-side index box 34 is disposed below the starting end of the path. A pair of main drive sprockets 35, 36 are mounted respectively on the main shaft 33 and an output shaft of the index box 34 and have a chain 37 reeved therearound. The index box 34 has an output shaft carrying a driven sprocket 38 thereon. A chain 39 is reeved around the driven sprocket 38 and the power transmission sprocket 32.

The first and second slats 21, 22 are formed with container holding apertures 41, 42, respectively, the apertures in each slat being six in number and arranged in a row longitudinally thereof. While the apertures 41, 42 of the slats 21, 22 are circular, the apertures 41 of the first slats 21 are larger than the apertures 42 of the second slats 22 in diameter.

When the main shaft 33 is driven through 360 degrees for one turn by the main motor of an unillustrated filling machine, both the slats 21, 22 are transported by one pitch P. The term "one pitch P" refers to the distance P1 between the centers of two first slats 21 at the front and rear sides of each second slat 22 (see FIG. 2).

Now, suppose the first slats 21 are in use. The first slats 21 then come to a stop one after another at a predetermined processing station S, such as a filling station, capping station or the like.

When the second slats 22 are to be used instead of the first slats 21, both the slats 21, 22 need to be shifted by one-half of a pitch so as to stop the second slats 22 at the processing station S. This can be accomplished by driving the main shaft 33 at a very low speed, holding the drive shaft 11 out of rotation with the clutch 31 disengaged while the main shaft 33 rotates through an angle corresponding to one-half of a pitch, e.g., through 90 degrees, during its rotation through 360 degrees, and thereafter driving the drive shaft 11 with the clutch 31 engaged.

Exemplary combinations of slats will be described next with reference to FIG. 2.

FIG. 2 (a) is a diagram showing the foregoing combination of first and second slats 21, 22. FIG. 2 (b) shows three kinds of slats 51, 52, 53 in combination. FIG. 2 (c) shows two kinds of slats 61 which are divided into groups each comprising two different slats 61 which are made integral. FIG. 2 (d) shows three kinds of slats 71 divided into groups each comprising three different slats 71 which are made integral. FIG. 2 (e) shows two different slats 81 which are integral, in combination with another kind of slat 82. In FIG. 2 (a) to (e), the respective pitches are indicated at P1 to P5.

Combinations other than those given above are also useful. For example, at least four kinds of container holding apertures are of course usable.

The conveyor, which is driven by the main motor, may alternatively be driven by a pulse motor, servomotor or the like specific thereto. The procedure for shifting the slats for the use of slats of different kind can then be omitted.

What is claimed is:

1. A conveyor for transporting different kinds of containers varying in size or the like, the conveyor comprising different kinds of container holders corresponding to the different kinds of containers, and means for moving the holders along a predetermined path intermittently by a specified pitch at a time, all the holders being divided into groups each comprising the combination of the different kinds of holders each one in number, the groups being arranged in succession along the path and being identical in the order of the kinds of holders in the group, the spacing between the holders of the same kind in the groups adjacent to each other being equal to the pitch the holders are moved at a time, wherein one of said groups of holders is selected by momentarily shifting the position of said holders by a fraction of the pitch.

2. A conveyor as defied in claim 1 wherein each of the holders comprises a slat having container holding apertures and connected between a pair of endless chains.

3. A conveyor as defined in claim 2 wherein the slats of different kinds of holders are separate from one another.

4. A conveyor as defined in claim 2 wherein the slats of different kinds of holders in each group are integral.

5. A conveyor as defined in claim 2 wherein the holders are at least three in the number of kinds thereof, and at least two kinds of slats among the slats of different kinds of holders in each group are integral.

6. A conveyor as defined in claim 2 wherein the chains are reeved around respective sprockets fixed to a drive shaft, and the drive shaft is driven by a drive source via a clutch.

7. A conveyor as defined in claim 1, wherein said fraction of the pitch equals one-half pitch.

* * * * *